A. L. DOEPKEN.
COMPUTING APPARATUS.
APPLICATION FILED MAR. 21, 1917.

1,265,756.

Patented May 14, 1918.
4 SHEETS—SHEET 1.

INVENTOR
A. L. Doepken
BY
ATTORNEY

A. L. DOEPKEN.
COMPUTING APPARATUS.
APPLICATION FILED MAR. 21, 1917.

1,265,756.

Patented May 14, 1918.
4 SHEETS—SHEET 2.

INVENTOR
A. L. Doepken.
BY
ATTORNEY

A. L. DOEPKEN.
COMPUTING APPARATUS.
APPLICATION FILED MAR. 21, 1917.
1,265,756.
Patented May 14, 1918.
4 SHEETS—SHEET 3.
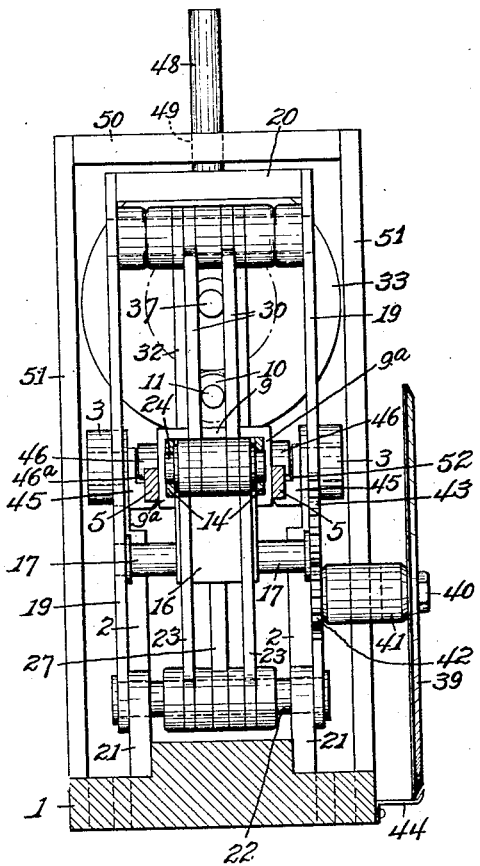
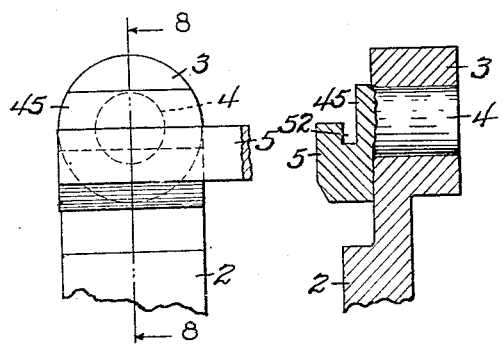
INVENTOR
A. L. Doepken.
BY
ATTORNEY

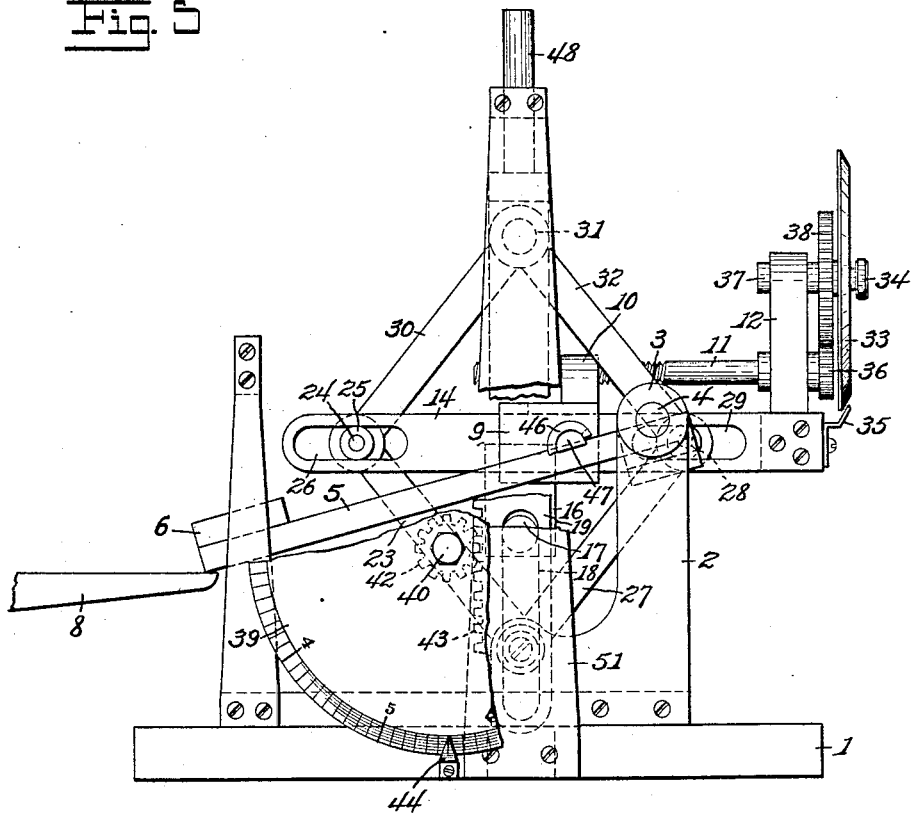

UNITED STATES PATENT OFFICE.

ALBERT L. DOEPKEN, OF WHEELING, WEST VIRGINIA.

COMPUTING APPARATUS.

1,265,756.          Specification of Letters Patent.       Patented May 14, 1918.

Application filed March 21, 1917. Serial No. 156,291.

*To all whom it may concern:*

Be it known that I, ALBERT L. DOEPKEN, a citizen of the United States of America, and resident of Wheeling, county of Ohio, and State of West Virginia, have invented certain new and useful Improvements in Computing Apparatus, of which the following is a specification.

This invention relates broadly to computing apparatus, and more particularly to a multiplying mechanism.

The primary object of the invention is to provide an apparatus which is particularly adapted for association with a weighing machine or scale whereby the aggregate prices of articles of widely varying weights at any unit of price may be computed and visually indicated.

A further object is to provide a device of the character mentioned whereby the aggregate prices of articles of variable weights at any given unit of price are automatically computed and indicated.

With these and other objects in view, the invention resides in the features of construction, arrangement of parts and combinations of elements which will hereinafter be exemplified, reference being had to the accompanying drawings, in which—

Fig. 4 is a transverse section on the line 4—4, Fig. 1;

Fig. 5 is a view similar to Fig. 1 showing the parts occupying actuated position;

Fig. 6 is an enlarged transverse section on line 6—6, Fig. 1;

Fig. 7 is an enlarged detail section on line 7—7, Fig. 2; and—

Fig. 8 is a section on line 8—8, Fig. 7.

Referring to said drawings, in which like designating characters distinguish like parts throughout the several views—

Figure 1:
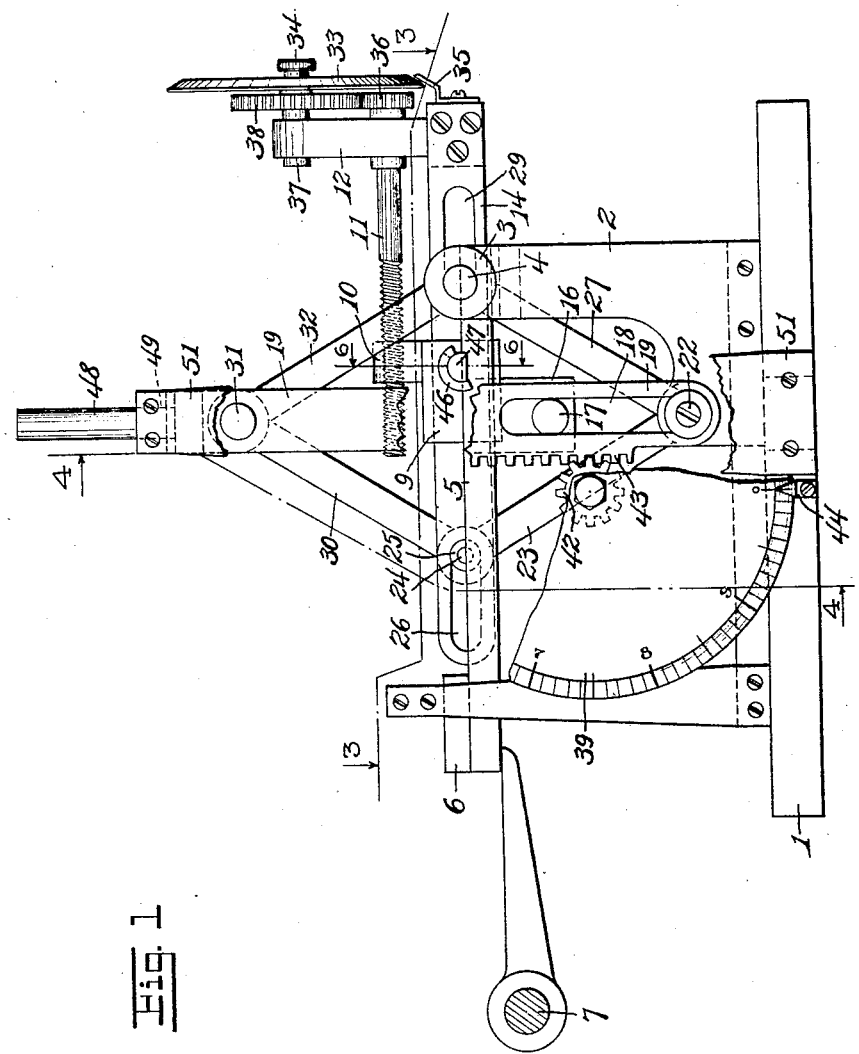
Figure 1 is a side elevation of the invention with its parts occupying normal position, portions of the frame and indicating dial being broken away for the sake of clearness.
Figure 2:
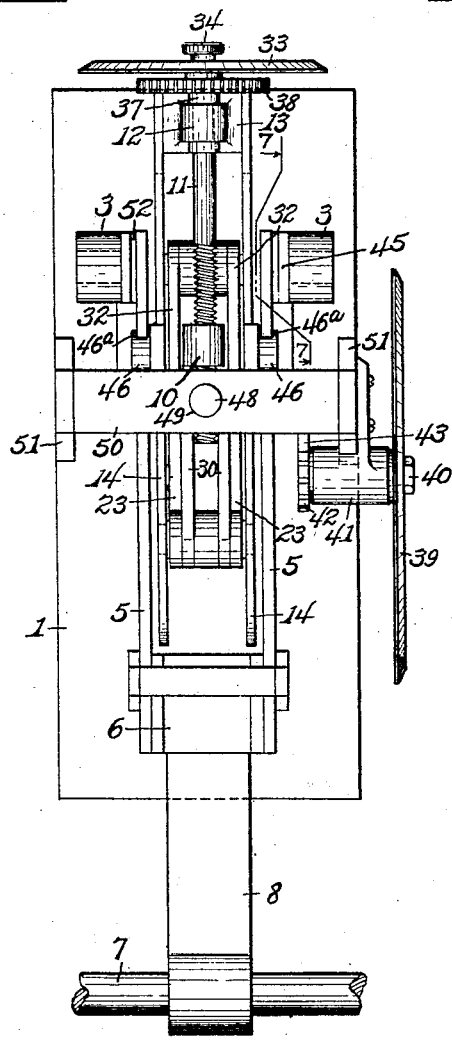
Fig. 2 is a top plan view of the same.
Figure 3:
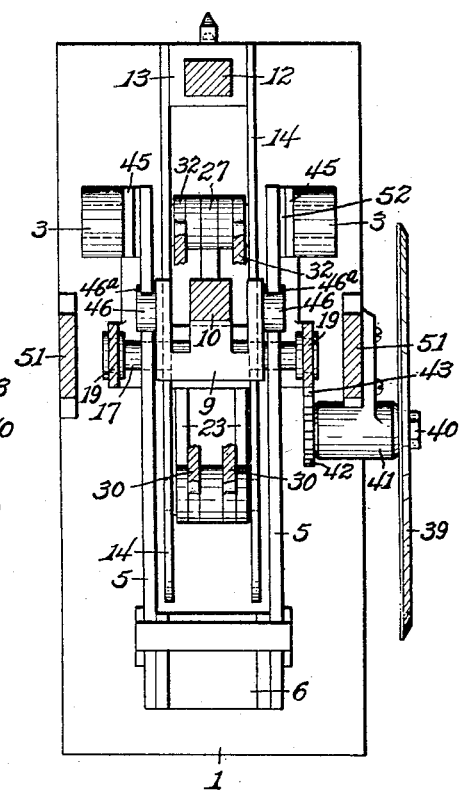
Fig. 3 is a horizontal section on the line 3—3, Fig. 1.

1 indicates a base which carries thereon adjacent to its rear end two oppositely disposed upright supporting members 2 surmounted by journal bearings 3 in which are mounted trunnions 4 carried by the rear ends of a pair of parallel bars 5 which are rigidly connected at a suitable point, as by a transverse bar or member 6, and which constitute a table adapted for association with a weight-actuated portion, as the scale-beam 7, of a weighing mechanism or scale. The front end of said table rests upon and is supported by an arm 8 carried by the scale-beam or other suitable portion of the scale in a normally horizontal position, as shown in Fig. 1, and is adapted to follow lowering movement of said arm when the latter is actuated to move downward under the influence of the weight of an article placed upon the scale platform.

The bars 5 serve as runways upon which travels an adjustable carriage 9 comprising a horizontal body portion and oppositely disposed side members 9ª, said carriage being surmounted by an interiorly threaded ferrule 10 in which is operatively disposed a portion of the body of a horizontal adjusting screw 11 which is swiveled adjacent to its outer end in an upright lug 12. Said lug is carried by a cross-piece 13 that rigidly connects the rear ends of a pair of longitudinally-extending parallel guide-bars 14 which are permanently disposed in horizontal position and are carried by said corriage, being mounted within the embrace of the side members 9ª, there being provided in said side members channels 15 of such form and size that said guide-bars are snugly received therein, although said carriage is disposed in slidable relation to the latter.

Rigidly supported by said guide-bars 14 in an intermediate position is a depending member 16 having a pair of opposite laterally disposed guide-arms 17, preferably of stub-shaft form, the outer ends of which are received in vertical guide-slots 18 provided in upright side-members or standards 19 constituting parts of a vertically movable frame, said standards being of appropriate length and having their upper ends connected, as by a cross-head 20.

Fixed upon the base 1 substantially midway between the ends of the latter and in direct transverse alinement with the standards 19 of said vertically movable frame is a pair of short oppositely disposed upright supports 21 in which are mounted the opposite ends of a pin or shaft 22 upon which are pivoted the lower ends of a pair of parallel upwardly and forwardly inclined bars or links 23 which have their opposite ends pivotally mounted upon a transversely disposed pin or shaft 24. Said pin 24 preferably carries upon its ends anti-friction rollers 25 which are received by and movable in longitudinally extending slots 26 provided in the opposite guide bars 14 adjacent to the front ends of the latter. Also pivoted upon said pin 22 intermediate said links 23 is the lower end of a bar or link 27 which extends upwardly and rearwardly and has its opposite end pivotally mounted upon a pin 28 similar to said pin 24 and which likewise carries anti-friction rollers that are received by and are movable in longitudinal slots 29 provided in said guide bars 14 adjacent to the rear ends of the latter. Also pivotally mounted upon said pin 24 are the lower ends of a pair of parallel links 30 which are inclined thence upward to and have their upper ends pivoted upon a transverse pin or shaft 31 having its opposite ends mounted in the frame members or standards 19 adjacent to the upper ends of the latter and in vertical alinement with the pin 22. In like manner a pair of links 32 have their opposite ends pivotally mounted upon said pins 28 and 31.

All of said links 23, 27, 30 and 32 are of even length, and, as is obvious, said links with their mountings constitute lazy tongs, the function of which will hereinafter be made apparent.

The adjusting screw 11 by means of which the carriage 9 is adjusted along the bars 5 has its threads disposed at a predetermined pitch so that in a single revolution thereof said carriage is actuated to travel a predetermined distance; and associated with said adjusting screw is a dial 33, a dial-rotating knob 34 and a pointer or indicator 35, said dial having thereon graduations (not shown) indicating units of price. For facilitating adjustment a suitable gearing is interposed between said dial and said adjusting screw whereby a single revolution of the former will communicate to the latter a plurality of rotations, said gearing, as herein depicted, consisting of a pinion 36 carried by said screw, a suitably mounted shaft 37 upon which the dial is carried, and a gear wheel 38 carried by said shaft in mesh with said pinion.

A second dial 39 having thereon price-indicating graduations is fixed upon the outer end of a shaft 40 which is journaled in a suitably located stationary bearing 41. Said shaft 40 also carries thereon a gear wheel 42 in mesh with a toothed rack 43 carried by, or formed integral with, one of the side members 19 of the vertically movable frame. As is apparent, said dial 39 is actuated to rotate by vertical movement of said movable frame; and a suitably located fixed indicator 44 is so associated with said dial 39 as to indicate on the latter the aggregate price of the article weighed, the dial 33 having been first properly adjusted to the unit of price applicable to said article. Thus it will be understood that said movable frame must be actuated through the intermediate parts to move definite distances accurately proportioned both to varying weights and varying units of price.

As hereinbefore indicated, the free end of the table which embodies the bars or runways 5 normally occupies a horizontal position, resting upon and being supported by the arm 8 carried by the scale beam 7, and gravitates, following the movement of said scale-beam when the latter is actuated to lower. As is evident, the guide-bars 14 and the parts sustained thereby, including the frame carrying the rack 43 through which the price-indicating dial 39 is actuated, move downward with the table. The extent of downward movement of said sustained parts and, consequently, the extent of rotation of said dial 39, is dependent, however, upon the position to which the carriage 9 has been adjusted with respect to the table, it being obvious that the farther the carriage is advanced from the axis upon which said table swings the greater is the distance through which the carriage is lowered with a given drop of the table.

When the price-unit dial 33 occupies zero position, the carriage 9 has the supporting portions thereof which rest upon the bars 5 of the table disposed in axial alinement with the bearings 3 in which said table is mounted. In such position of the carriage no amount of lowering movement of the table will result in the carriage being lowered.

To the end that the supporting portions of the carriage may assume axial relation to said bearings 3 requires both that a special form of support and a special construction or mounting arrangement for the table be provided. To accomplish this the top edges or faces of the bars 5 are permanently disposed in the plane of the axes of the trunnions 4, as is clearly shown in Figs. 6, 7 and 8, each of said bars having fixed thereto, or formed integral therewith, adjacent to its rear end a laterally disposed arm 45 of L-shape which carries the trunnion 4 upon the outer face of the upright member thereof. Furthermore, the supporting portions of the carriage 9 comprise arc-shaped hangers 46 carried by the opposite side members 9$^a$, and slide-blocks 47 of semi-cylindrical form disposed in underlying supporting relation to said hangers, said slide-blocks having their convex or semi-circular surfaces conformably received against the concave faces of said hangers, while their flat under surfaces are slidably seated upon the top faces of said bars 5. Depending flanges 46$^a$ formed at the outer edges of said hangers serve to confine said slide-blocks 47 in place. Said slide-blocks rotate or rock with vertical movements of the table, the superposed weight sustained thereby serving to constantly hold said blocks in positions wherein their said flat under surfaces are closely seated throughout on said bars 5. Longitudinal channels 52 are provided in the arms 45 to permit the flanges 46ª of the hangers 46 to unobstructedly move to positions wherein said hangers and said slide-blocks are alined with the trunnions 4.

As the carriage is moved forward from zero position—that is, from the position in which a transverse line crossing the flat under faces of said slide-blocks 47 midway between their ends is coincident with the axial line of the trunnions 4—the said slide-blocks travel along the bars 5 of the table, and, as is obvious, the greater the distance of the advance the greater will be the vertical distance which must be traversed by said carriage and the parts sustained thereby, including the rack 43, when the table is lowered following depression of the scale-beam 8 of the scale. And from this it will be understood that the length of the vertical movement of the carriage and, therefore, the extent of forward rotation of the price-indicating dial is directly proportional to the unit price to which the dial 33 is adjusted and the weight of the article. In fact, the mechanical construction herein described is based upon the fixed mathematical principle which, expressed in the terms of a geometrical theorem, is that homologous sides of similar triangles are proportional. In the machine described, one side of a triangle is constituted by the normal horizontal line of the upper faces of the bars 5 of the table, a second side by the inclined line of said faces when the table is lowered, and the third side by the vertical line through which the center of rotation of the slide-blocks 47 travels from the first-mentioned line to the second-mentioned line.

It will be noted that absolutely invariable accuracy is afforded by the construction which involves the arrangement of the upper faces of the bars 5 in the line of the axis upon which the table swings and by the provision of the rockable slide-blocks 47 of true semi-cylindrical form.

In practice, when an article is placed upon the scale platform the scale-beam is tipped downward, lowering the arm 8 and the free end of the table supported by said arm, the extent of the lowering movement being dependent upon the weight of said article. The dial 33 is turned to carry the appropriate unit of price into register with the indicator, thus, through the intermediate gearing, adjusting the position of the carriage with respect to the axis of the table. As is obvious, this adjustment may be effected either prior or subsequent to the placing of the article upon the scale. The carriage 9 is thus lowered a distance which, as hereinbefore indicated, is related proportionally to the weight of the article and the unit of price, and it carries therewith the guide-bars 14 which are supported thereby, thus shortening the vertical reach of the lazy tongs, the front and rear joints of which are slidably supported in the opposite ends of said guide-bars. With this shortening movement the vertically movable frame which is supported by the upper end of said lazy tongs is carried vertically downward, causing the toothed rack 43 carried by one of its side members 19 to impart rotary movement to the price-indicating dial 39 through the intermediacy of the gear 42 and shaft 40.

An upright post 48 mounted upon the cross member 20 of said vertically movable frame serves as a guide whereby the latter is accurately guided in its movements, said post being movable through an opening 49 provided therefor in a suitable stationary part, as a transverse bar 50 fixed upon upright stationary supports 51 carried by the base 1.

While I have herein described the invention as designed for association with a weighing mechanism or scale for computing the aggregate prices of articles of variable weights in accordance with any unit price determined by the operator, it will be apparent that the invention is not limited to such use, but may be employed as a multiplying mechanism in various other relations.

What is claimed is—

1. A computing apparatus comprising, in association with a weight-actuated part of a weighing mechanism, a table having one end pivotally supported and its opposite end supported by and vertically movable with said weight-actuated part, a carriage mounted upon and vertically movable with said table and horizontally adjustable along the latter according to the unit of price, a visual price-indicating device, and means including vertically guided lazy tongs interposed between said carriage and said indicating device whereby the latter is actuated to an extent governed by the extent of movement of the table and the position occupied by said carriage.

2. A computing apparatus comprising, in association with a weight-actuated part of a weighing mechanism, a table having one end pivotally supported and its opposite end vertically movable and under the control of said weight-actuated part, a carriage mounted upon said table in permanently horizontal position and adjustable thereon according to the unit of price, both when said table occupies horizontal position and inclined position, a visual price-indicating device, and means including vertically guided lazy tongs interposed between said carriage and said indicating device whereby the latter is actuated to an extent governed by the vertical distance traversed by said carriage when said table is lowered.

3. A computing apparatus comprising, in association with a weight-actuated part of a weighing mechanism, a table having one end pivotally supported and its opposite end vertically movable and under the control of said weight-actuated part, said table being normally sustained in a horizontal position, a carriage mounted upon and adjustable along said table according to the unit of price, a visual price-indicating device, and means including vertically guided lazy tongs under the control of said carriage whereby, when said table is lowered, said indicating device is actuated to an extent governed by the vertical distance traversed by said carriage in moving from the normal level of the table to the lowered position of the latter.

4. A computing apparatus comprising, in association with a weight-actuated part of a weighing mechanism, a table having one end pivotally supported and its opposite end vertically movable and under the control of said weight-actuated part, said table being normally sustained in a horizontal position, a non-tiltable vertically-movable carriage mounted upon and adjustable along said table according to the unit of price, a visual price-indicating device, and means including lazy tongs under the control of said carriage whereby, when the latter is lowered with tilting movement of said table said indicating device is actuated to an extent proportional to the distance through which the table is lowered and the distance of said carriage from the axis upon which the table swings.

5. A computing apparatus comprising, in association with a weight-actuated part of a weighing mechanism, a table having one end pivotally mounted and its opposite end vertically movable and under the control of said weight-actuated part, said table being normally sustained in a horizontal position and embodying parallel bars having their top faces permanently disposed in the axial plane of the pivotal mounting of said table, a non-tiltable carriage adjustable over said table, rotary supports for said carriage interposed between the latter and the said top faces of said bars and slidable upon the latter, said supports having their centers of rotation permanently disposed in the plane of said top faces, a visual price-indicating device, and means under the control of said carriage whereby, when said table is lowered, said indicating device is actuated to an extent determined by the vertical distance traversed by said carriage in moving from the normal level of the table.

6. A computing apparatus comprising, in association with a weight-actuated part of a weighing mechanism, a table having one end pivotally mounted and its opposite end vertically movable and under the control of said weight-actuated part, said table being normally sustained in a horizontal position and embodying parallel bars having their top faces permanently disposed in the axial plane of the pivotal mounting of said table, a non-tiltable carriage adjustable over said table, arcuately curved hangers carried by said carriage, semi-cylindrical blocks having their flat faces slidably mounted upon said bars and having their convex portions conformably and rotatably received in underlying supporting relation to said hangers, a visual price-indicating device, and mechanism including a toothed rack and gearing interposed between said carriage and said indicating device whereby, when said table assumes an inclined position, said indicating device is actuated to an extent determined by the vertical distance traversed by said carriage in following said table from the normal level of the latter.

7. A computing apparatus comprising, in association with a weight-actuated part of a weighing mechanism, a table having one end pivotally mounted and its opposite end vertically movable and under the control of said weight-actuated part, said table being normally sustained in a horizontal position and embodying parallel bars having their top faces permanently disposed in the axial plane of the pivotal mounting of said table, a non-tiltable carriage adjustable over said table, arcuately curved hangers carried by said carriage, semi-cylindrical blocks having their flat faces slidably mounted upon said bars and having their convex portions conformably and rotatably received in underlying supporting relation to said hangers, a visual price-indicating device, gearing for actuating said indicating device, a toothed rack operatively associated with said gearing, and means under the control of said carriage and actuated by vertical movement of the latter whereby, when said table is lowered, said rack is actuated to operate said indicating device to an extent governed by the vertical distance traversed by said carriage in following said table from the normal level of the latter.

8. A computing apparatus comprising, in association with a weight-actuated part of a weighing mechanism, a table having one end pivotally mounted and its opposite end vertically movable and under the control of said weight-actuated part, said table being normally sustained in a horizontal position and embodying parallel bars having their top faces permanently disposed in the axial plane of the pivotal mounting of said table, a non-tiltable carriage adjustable over said table, arcuately curved hangers carried by said carriage, semi-cylindrical blocks having their flat faces slidably mounted upon said bars and having their convex portions conformably and rotatably received in underlying supporting relation to said hangers, a visual price-indicating device, gearing for actuating said indicating device, a toothed rack operatively associated with said gearing, and means including lazy tongs under the control of said carriage and actuated by vertical movement of the latter whereby, when said table is lowered, said rack is actuated to operate said indicating device to an extent governed by the vertical distance traversed by said carriage in following said table from the normal level of the latter.

9. A computing apparatus comprising, in association with a weight-actuated part of a weighing mechanism, a table having one end pivotally supported and its opposite end vertically movable and under the control of said weight-actuated part, said table being normally sustained in a horizontal position, a carriage mounted upon and adjustable along said table according to the unit of price, a visual price-indicating device, gearing for actuating said indicating device, a toothed rack operatively associated with said gearing, and means including vertically guided lazy tongs under the control of said carriage and actuated by vertical movement of the latter whereby, when said table is lowered, said rack is actuated to operate said indicating device to an extent governed by the vertical distance traversed by said carriage in following said table from the normal level of the latter.

10. A computing apparatus comprising, in association with a weight-actuated part of a weighing mechanism, a table having one end pivotally mounted and its opposite end movable in a vertical plane and under the control of said weight-actuated part, said table being normally sustained in a horizontal position, a carriage mounted on said table and having supports normally disposed in the axial line of the pivot upon which said table swings, said carriage being adapted for longitudinal adjustment on said table, means for adjusting said carriage in accordance with the unit of price, a price-indicating dial, and means including lazy tongs interposed between said carriage and said dial whereby movements definitely related to the movements of the table from its normal position and the position occupied by the adjusted carriage are imparted to said dial.

11. A computing apparatus comprising, in association with a weight-actuated part of a weighing mechanism, a table having one end pivotally mounted and its opposite end movable in a vertical plane and under the control of said weight-actuated part, said table being normally sustained in a horizontal position, a carriage mounted on said table and having supports normally disposed in the axial line of the pivot upon which said table swings, said carriage being adapted for longitudinal adjustment on said table, means for adjusting said carriage in accordance with the unit of price, a price-indicating dial, and means including vertically-guided lazy tongs interposed between said carriage and said dial whereby the latter is actuated to rotate a distance definitely proportional to the relative distances from normal through which said table and said carriage are actuated, said lazy tongs having its lower end disposed in fixed position.

In testimony whereof, I affix my signature in presence of two subscribing witnesses.

ALBERT L. DOEPKEN.

Witnesses:
  H. E. DUNLAP,
  W. F. KEEFER.